(12) United States Patent
Tsuji

(10) Patent No.: US 8,151,131 B2
(45) Date of Patent: Apr. 3, 2012

(54) SIGNAL SYNCHRONIZATION METHOD AND SIGNAL SYNCHRONIZATION CIRCUIT

(75) Inventor: Ryuichi Tsuji, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 428 days.

(21) Appl. No.: 12/511,001

(22) Filed: Jul. 28, 2009

(65) Prior Publication Data
US 2010/0023792 A1   Jan. 28, 2010

(30) Foreign Application Priority Data
Jul. 28, 2008 (JP) .................................. 2008-193691

(51) Int. Cl.
G06F 1/12 (2006.01)
G06F 13/42 (2006.01)

(52) U.S. Cl. ............................ 713/400; 713/375; 713/600

(58) Field of Classification Search .................. 713/400, 713/375, 600
See application file for complete search history.

(56) References Cited

U.S. PATENT DOCUMENTS
4,855,901 A * 8/1989 Planteline .................... 710/105
5,537,582 A * 7/1996 Draeger ....................... 713/401

FOREIGN PATENT DOCUMENTS
JP  2008-071221 A   3/2008

* cited by examiner

Primary Examiner — Thuan Du
(74) Attorney, Agent, or Firm — Kilpatrick Townsend & Stockton LLP

(57) ABSTRACT

There is provided a signal synchronization method of performing signal synchronization between a device which operates in synchronization with a first clock signal and a processor which operates in synchronization with a second clock signal with a different cycle from that of the first signal.

4 Claims, 5 Drawing Sheets

SIGNAL SYNCHRONIZATION METHOD AND SIGNAL SYNCHRONIZATION CIRCUIT This application claims priority to Japanese Patent Application No. 2008-193691, filed Jul. 28, 2009, the entirety of which is incorporated by reference herein.

BACKGROUND

1. Technical Field

The present invention relates to a signal synchronization method and a signal synchronization circuit.

2. Related Art

Generally, a technique has been known which uses a synchronization circuit for outputting data transmitted from a transmitter to a receiver by synchronizing the data with the clock signal of the receiver when devices, which are respectively operated by clock signals of different periods, exchange data (for example, refer to Japanese Unexamined Patent Application Publication No. 2008-71221).

However, some processors change a request signal from an inactive state to an active state when requesting the exchange of data, but do not change the request signal into the inactive state and maintain the active state when successively issuing the subsequent request. In such a case, a problem arises in that the subsequent request is not detected although the synchronization circuit synchronizes the request signal with the clock signal of the receiver. As examples of this case, FIG. 5A shows a configuration of a synchronization circuit 100 having shift registers in two stages, and FIG. 5B shows the relationship between a request signal of a processor input to the synchronization circuit 100 and an output from the synchronization circuit 100. In FIG. 5B, the processor causes the request signals to rise at time t0 and change from an inactive state to an active state, and issues the subsequent request so as to maintain the active state of the request signal at time t3. In this case, in response to the first request, the output of the synchronization circuit 100 rises at time t2 and the inactive state is changed to the active state by the rising edges of the clock signal of the receivers two times at time t1 and time t2. Hence, the receiver is able to detect the request issued from the processor. However, in response to the subsequent request at time t3, the output of the synchronization circuit 100 will rise at time t5 similarly to the previous request, but the active state based on the first request is continuously maintained ahead of time t5. Therefore, there is no change in the output, and thus the receiver is unable to detect the subsequent request.

SUMMARY

An advantage of some aspects of the invention is that it enables the device to distinguish between the previous request and the subsequent request issued from the processor.

In order to achieve the above mentioned advantage of some aspects of the invention, the following configurations are adopted.

According to an aspect of the invention, there is provided a signal synchronization method of performing signal synchronization between a device which operates in synchronization with a first clock signal and a processor which operates in synchronization with a second clock signal on a different cycle from that of the first signal, changes a request signal from an inactive state to an active state when data communication with the device is requested, then maintains the request signal in the active state when detecting an acknowledgement signal for the request signal and successively issuing the subsequent request, and changes the request signal to the inactive state when not successively issuing the subsequent request. The signal synchronization method includes: (a) converting the request signal, which is input by the processor, into a synchronized request signal which is synchronized with the first clock signal; (b) outputting the synchronized request signal to the device without masking the synchronized request signal until a mask start time and outputting the synchronized request signal which is changed into the inactive state by masking the synchronized request signal after the mask start time, the mask start time being set as a time at which the first clock signal is changed from the inactive state to the active state after the output synchronized request signal is changed from the inactive state to the active state and the device is able to receive the synchronized request signal; (c) converting the maintained request signal in the active state into the synchronized request signal, which is input from the processor and is synchronized with the first clock signal, when the processor, which has input the acknowledgement signal, issues the subsequent request while maintaining the request signal in the active state; and (d) outputting the synchronized request signal, which is changed into the inactive state by masking the synchronized request signal, to the device before a predetermined mask duration elapses from the mask start time, and outputting the synchronized request signal, which is not masked, to the device after the mask duration elapses from the mask start time. The mask duration is set to be not less than a time period from the mask start time to a time at which the converting (c) of the maintained request signal in the active state into the synchronized request signal can be performed regardless of the timing difference between the first clock signal and the second clock signal.

In the signal synchronization method, the synchronized request signal, which is output until the predetermined mask duration elapses from the mask start time, is changed into the inactive state by masking the synchronized request signal. Hence, when the subsequent request is successively received, the synchronized request signal, which is output after the mask duration elapses, is changed from the inactive state to the active state. In contrast, when the subsequent request is not successively received, the synchronized request signal, which is output after the mask duration elapses, is continuously maintained in the inactive state. Accordingly, the device is able to distinguish between the previous request and the subsequent request issued from the processor. Furthermore, the mask duration is set to be not less than the time period from the mask start time to the time at which the converting of the maintained request signal in the active state into the synchronized request signal, which is input from the processor and is synchronized with the first clock signal when the processor issues the subsequent request while maintaining the request signal in the active state, can be performed regardless of the timing difference between the first clock signal and the second clock signal. Hence, the mask duration does not elapse before the subsequent request is received. Specifically, the synchronized request signal is not falsely output to the device by changing the signal from the inactive state to the active state as the mask duration has elapsed when the active state of the request signal based on the previous request is continued. Accordingly, it is possible to prevent the device from erroneously detecting the request issued from the processor.

In the signal synchronization method according to this aspect of the invention, it is preferred that the mask duration be set as a time period from the mask start time to a time at which the converting (c) of the maintained request signal in the active state into the synchronized request signal can be performed regardless of the timing difference between the first clock signal and the second clock signal. In such a manner, the mask duration is minimized, and thus the device is able to detect the subsequent request issued from the processor in the shortest period of time.

Furthermore, in the signal synchronization method according to this aspect of the invention, it is preferred that the first clock signal be a clock signal having a cycle longer than that of the second clock signal.

According to another aspect of the invention, there is provided a signal synchronization circuit for performing signal synchronization between a device which operates in synchronization with a first clock signal and a processor which operates in synchronization with a second clock signal on a different cycle from that of the first signal, changes a request signal from an inactive state to an active state when data communication with the device is requested, then maintains the request signal in the active state when detecting an acknowledgement signal for the request signal and successively issuing the subsequent request, and changes the request signal to the inactive state when not successively issuing the subsequent request. The signal synchronization circuit includes: a synchronization section for converting the request signal, which is input by the processor, into a synchronized request signal which is synchronized with the first clock signal; and a signal output section for outputting the synchronized request signal to the device without masking the synchronized request signal until a mask start time and outputting the synchronized request signal which is changed into the inactive state by masking the synchronized request signal after the mask start time, the mask start time being set as a time at which the first clock signal is changed from the inactive state to the active state after the output synchronized request signal is changed from the inactive state to the active state and the device is able to receive the synchronized request signal. The signal output section outputs the synchronized request signal, which is changed into the inactive state by masking the synchronized request signal, to the device before a predetermined mask duration elapses from the mask start time, and outputs the synchronized request signal, which is not masked, to the device after the mask duration elapses from the mask start time. The mask duration is set to be not less than a time period from the mask start time to a time at which the synchronization section is able to convert, regardless of the timing difference between the first clock signal and the second clock signal, the maintained request signal in the active state into the synchronized request signal, which is input from the processor and is synchronized with the first clock signal, when the processor, which has input the acknowledgement signal, issues the subsequent request while maintaining the request signal in the active state.

Similarly to the above-mentioned signal synchronization method, in the signal synchronization circuit, the synchronized request signal, which is output until the predetermined mask duration elapses from the mask start time, is changed into the inactive state by masking the synchronized request signal. Hence, it is possible to obtain an advantage that the device is able to distinguish between the previous request and the subsequent request issued from the processor. Furthermore, the mask duration is set to be not less than the time period from the mask start time to the time at which the converting of the maintained request signal in the active state into the synchronized request signal, which is input from the processor and is synchronized with the first clock signal when the processor issues the subsequent request while maintaining the request signal in the active state, can be performed regardless of the timing difference between the first clock signal and the second clock signal. Hence, it is also possible to obtain an advantage that the device can be prevented from erroneously detecting the request issued from the processor. Furthermore, in the signal synchronization circuit, the section for performing the steps of the above-mentioned signal synchronization method may be added.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
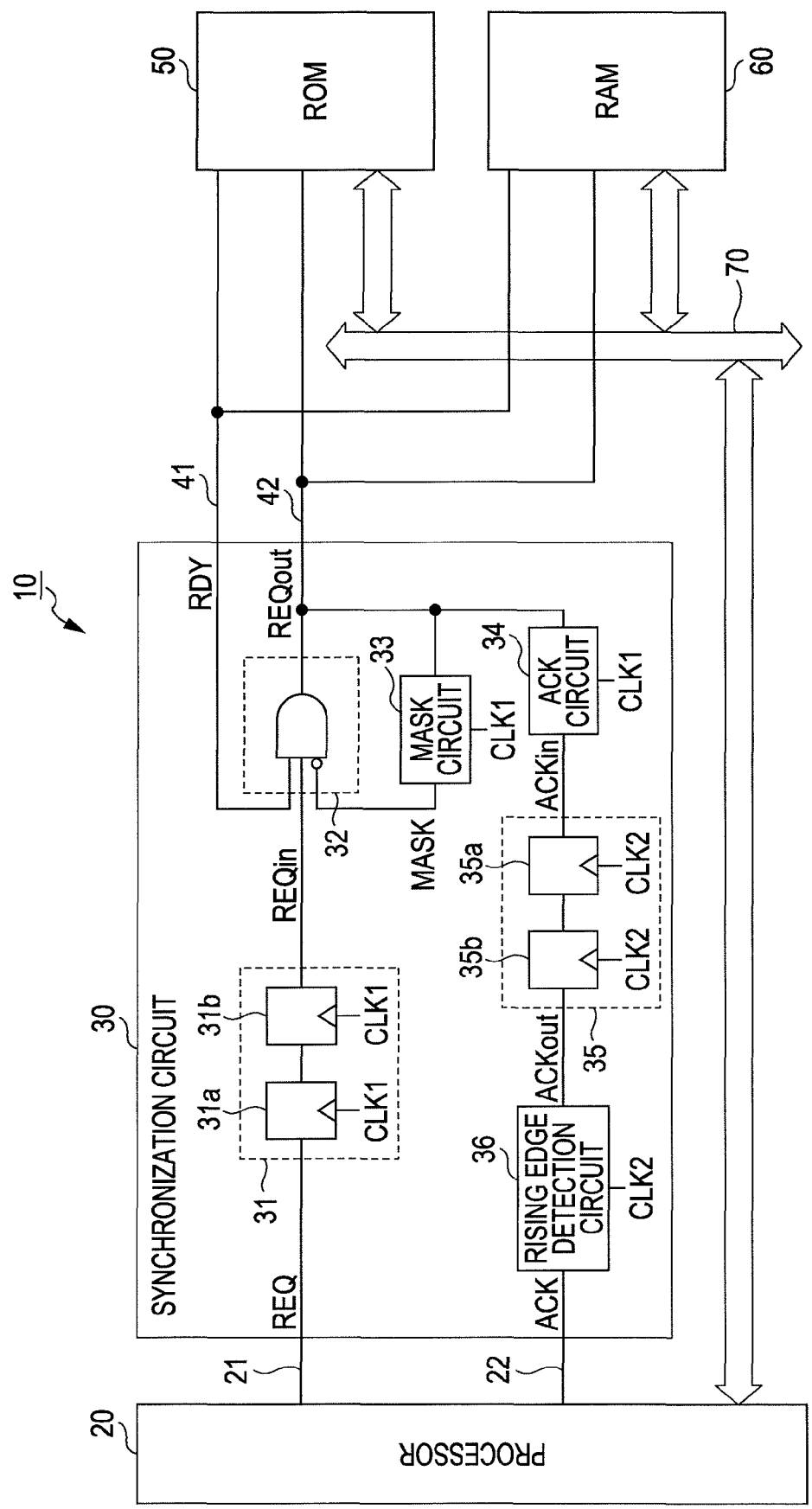
FIG. 1 is a configuration diagram schematically illustrating a configuration of a processor system according to an embodiment.

Hereinafter, an embodiment of the invention will be described with reference to the accompanying drawings. FIG. 1 is a configuration diagram schematically illustrating a configuration of a processor system 10 according to the embodiment.

In the processor system 10, a bus 70 interconnects a processor 20, a ROM 50 for storing data such as a program executed by the processor 20, and a RAM 60 for temporarily storing data as shown in FIG. 1. Further, a synchronization circuit 30 also interconnects the processor 20, the ROM 50, and the RAM 60. Furthermore, the ROM 50 and RAM 60 are devices operated by a clock signal CLK1 with a period T1 (T1 is a positive integer), and the processor 20 is a device operated by a clock signal CLK2 with a period T2 (T2=½·T1 in the embodiment).

The processor 20 is a processor for controlling a printing process. Although not illustrated, the processor 20 includes a register for temporarily storing data used for calculation, an arithmetic-logic unit for actually executing calculation, a processor interface (PIF) for exchanging data and signals with the bus 70 and the synchronization circuit 30, and a sequencer for controlling operations of modules (the register, the arithmetic-logic unit, the PIF, and the like) in the processor 20. The processor 20 is connected to the synchronization circuit 30 through a REQ signal line 21 and an ACK signal line 22. The REQ signal line 21 outputs a request signal REQ for requesting the exchange of data with the ROM 50 and the RAM 60. The ACK signal line 22 inputs an acknowledgement signal ACK for notifying that the request for the exchanging of data is transmitted to the ROM 50 and the RAM 60. Although described later in detail, when the processor 20 exchanges data with the ROM 50 and the RAM 60, the processor 20 requests the exchange of data by changing the signal REQ from the inactive state to the active state, and confirms that the request is exactly transmitted to an opponent when the signal ACK is changed from the inactive state to the active state. Furthermore, the processor 20 maintains the signal REQ in the active state without changing the signal REQ into the inactive state when subsequently requesting exchange of the next data after the signal ACK is changed from the inactive state to the active state, and changes the signal REQ into the inactive state when not issuing the request. Further, the instructions in the printing process is defined as instructions to read image data of a printing target stored in the RAM 60 in accordance with the program read from the ROM 50, generate the print image data from the read image data, store the data in the RAM 60, and allow the unillustrated printing process device to print the print image data.

The bus 70 includes, although not illustrated, an address signal line for inputting an address signal, which instructs whether or not to exchange data with any one of the ROM 50 and the RAM 60, from processor 20, a control signal line for inputting various control signals, which instruct whether or not to perform reading or recording, from processor 20, and a data signal line for inputting and outputting data exchanged among the processor 20, the ROM 50, and the RAM 60.

The ROM 50 and the RAM 60 are connected to the synchronization circuit 30 through a RDY signal line 41 and a REQout signal line 42. The RDY signal line 41 inputs a ready signal RDY for notifying whether or not the ROM 50 and the RAM 60 is prepared to receive the data. The REQout signal line 42 inputs a signal REQout which is a signal output from the synchronization circuit 30. The ROM 50 and the RAM 60 are also connected to the processor 20 through the bus 70. Furthermore, the signal RDY is changed in the active state when the ROM 50 and the RAM 60 are prepared to receive the data and the signal, and is changed in the inactive state when the ROM 50 and the RAM 60 are not prepared to receive the data and the signal. The ROM 50 and the RAM 60 performs reading or recording by outputting the data to the bus 70 or inputting the data from the bus 70 at the time at which the signal REQout is changed into the active state when reading or recording is instructed by the address signal and the control signal of the above-mentioned bus 70.

The synchronization circuit 30 is a device for performing signal synchronization among the ROM 50 and the RAM 60 operated by the clock signal CLK1 and the processor 20 operated by the clock signal CLK2. The synchronization circuit 30 includes an input synchronization circuit 31, a signal output circuit 32, a mask circuit 33, an acknowledge (ACK) circuit 34, an output synchronization circuit 35, and a rising edge detection circuit 36.

The input synchronization circuit 31 is constituted by a two-stage shift register having registers 31a and 31b which hold the input generated when the clock signal CLK1 is changed from the inactive state to the active state. The input synchronization circuit 31 converts the input signal REQ into the signal REQin, which is synchronized with the clock signal CLK1, and outputs the signal REQin.

The signal output circuit 32 is a circuit for outputting a signal REQout represented by a negative AND of the signal REQin, the signal RDY, and a signal MASK output from the mask circuit 33. Accordingly, the signal REQin is in the active state, the ROM 50 and the RAM 60 are prepared to receive the data, and the signal REQout is changed into the active state when the signal MASK is in the inactive state.

Figure 2:
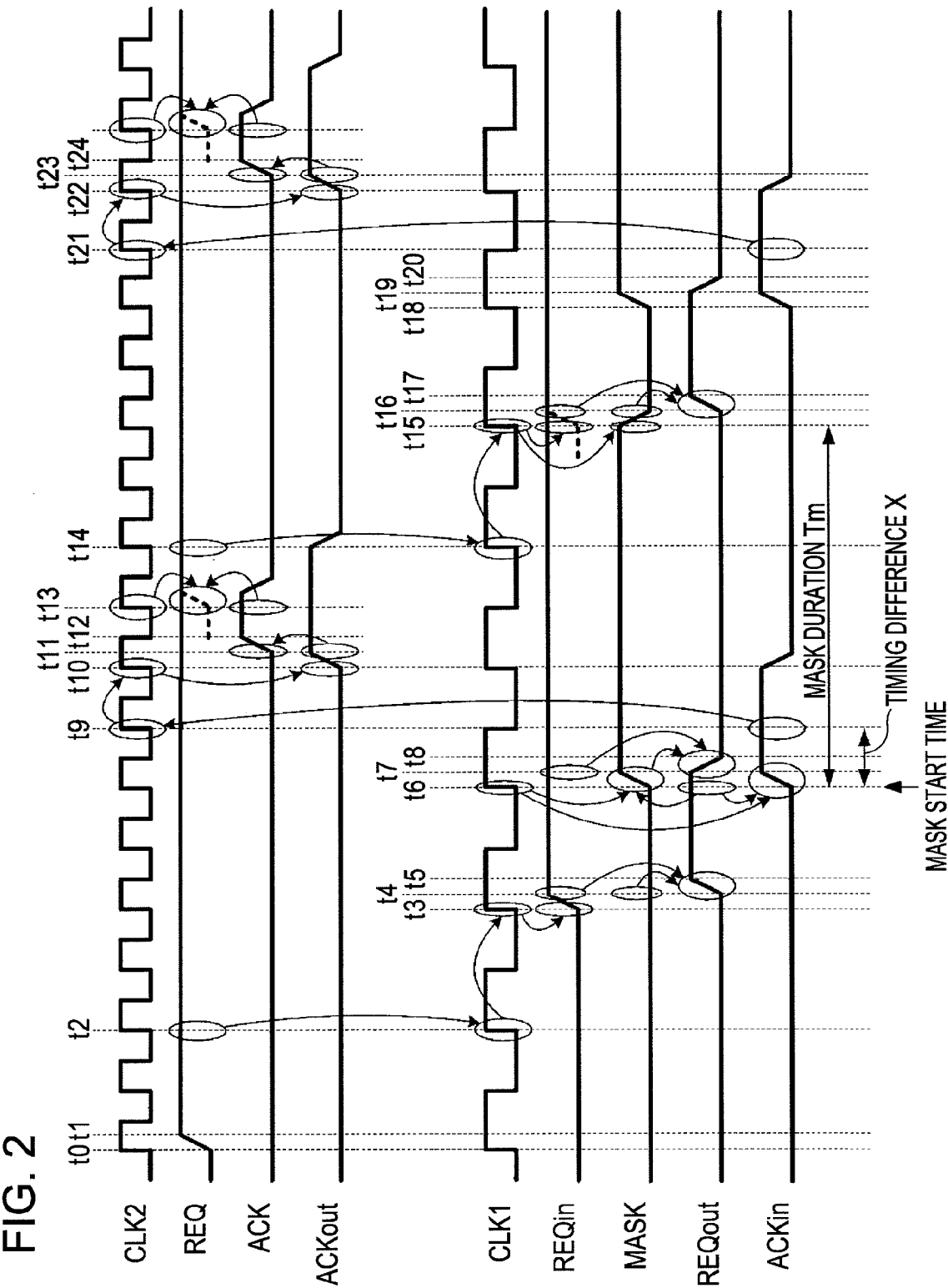
FIG. 2 is an example of a timing chart illustrating signal states in the embodiment.

The mask circuit 33 is a circuit which is operated by the clock signal CLK1 and outputs the signal MASK by inputting the signal REQout. The mask circuit 33 causes the signal MASK to rise and change from the inactive state to the active state at a mask start time which is set as a time at which the clock signal CLK1 is changed from the inactive state to the active state after the signal REQout is changed from the inactive state to the active state, as shown in FIG. 2. Then, the mask circuit 33 continuously maintains the signal MASK in the active state until a mask duration Tm (Tm=3·T1 in the embodiment) after the mask start time, and causes the signal MASK to fall and change into the inactive state when the mask duration Tm elapses. Thereby, the signal REQout, which is an output of the signal output circuit 32, is in the inactive state until the mask duration Tm elapses from the mask start time.

The ACK circuit 34 is a circuit which is operated by the clock signal CLK1 and outputs a signal ACKin by inputting the signal REQout. The ACK circuit 34 maintains the signal ACKin in the active state only during the time period until the period T1 elapses from the mask start time as shown in FIG. 2.

The output synchronization circuit 35 is constituted by the two-stage shift register having the register 35a and 35b which hold the input generated when the clock signal CLK2 is changed from the inactive state to the active state. The output synchronization circuit 35 converts the input signal ACKin into a signal ACKout which is synchronized with the clock signal CLK2, and outputs the signal ACKout.

The rising edge detection circuit 36 is a circuit which is operated by the clock signal CLK2 and outputs the signal ACK by inputting the signal ACKout. The rising edge detection circuit 36 maintains the signal ACK in the active state only during time period until the period T2 elapses from the time at which the input signal ACKout rises from the inactive state to the active state as shown in FIG. 2.

Next, an operation of the processor system 10 according to the embodiment configured as described above will be described. In particular, an operation of the synchronization circuit 30 performed when the processor 20 exchanges the data with the ROM 50 and RAM 60 will be described.

FIG. 2 is an example of a timing chart illustrating the states of the clock signal CLK2, the signal REQ, the signal ACK, the signal ACKout, the clock signal CLK1, the signal REQin, the signal MASK, the signal REQout, and the signal ACKin when the processor 20 successively requests the recording of data in the RAM 60. Furthermore, in the embodiment, all these signals are positive logics, and the values 1 and 0 respectively represent an active state and an inactive state.

When the processor 20 records the data in the RAM 60, the processor 20 outputs a data signal which is the data to be recorded, the control signal which instructs the recording, and the address signal which designates the RAM 60, to the bus 70. Simultaneously, the processor 20 causes the signal REQ to rise at time t0, at which the clock signal CLK2 is changed into the active state, in FIG. 2. Then, the signal REQin, which is the output of the input synchronization circuit 31, rises at time t3 at which the clock signal CLK1 rises a second time after the signal REQ is changed from the inactive state to the active state at time t1. Then, the signal REQin is changed into the active state at time t4. At time t4, it is assumed that the RAM 60 is prepared to receive the data and the signals, and the signal RDY is already in the active state. Furthermore, the signal MASK is not changed into the active state when the signal REQout has not even once changed into the active state, and thus is in the inactive state at time t4.

When the signal REQin is changed into the active state at time t4, the signal MASK is in the inactive state. On the other hand, since the signal RDY is in the active state, the signal REQout, which is the output of the signal output circuit 32, rises. Furthermore, when the RAM 60 is not prepared to receive the data and signals, the signal REQout rises at the time at which the signal RDY is changed into the active state.

When the signal REQout rises at time t4 and is changed into the active state at time t5, the data of the data signal line of the bus 70 at time t5 is recorded in the RAM 60. Here, the processor 20 continuously outputs the address signal, the control signal, and the data signal which are output from the bus 70 at time t0. Therefore, the data requested to be recorded by the processor 20 is recorded in the RAM 60. Then, the mask circuit 33 causes the output signal MASK to rise at the mask start time. Here, the mask start time is time t6 at which the clock signal CLK1 is changed from the inactive state to the active state after the signal REQout is changed from the inactive state to the active state at time t5. Further, the ACK circuit 34 causes the signal ACKin to rise at time t6 which is the mask start time, and be in the active state until the period T1 elapses. Thereby, the signal MASK and the signal ACKin are changed into the active state at time t7.

When the signal MASK is changed into the active state at time t7, the signal REQout, which is the output of the signal output circuit 32, falls, and is changed into the inactive state at time t8. Further, when the signal ACKin is changed into the active state at time t7, the signal ACKout which is the output of the output synchronization circuit 35 rises at time t10 at which the clock signal CLK2 rises a second time after time t7, and is changed into the active state at time t11.

When the signal ACKout is changed into the active state at time t11, the signal ACK, which is the output of the rising edge detection circuit 36, rises, and is changed into the active state at time t12. Then, the signal ACK is in the active state until the period T2 elapses from time t11.

The signal ACK is changed into the active state at time t12, and thus the processor 20 confirms that the recording is performed on the basis of the request of the recording in the RAM 60 at time t0. Then, at time t13 at which the clock signal CLK2 is changed into the active state after time t12, the processor 20 maintains the signal REQ in the active state without changing the signal REQ into the inactive state when successively issuing the subsequent request. When the request at time t13 is not successive with the previous request, the signal REQ has been in the inactive state. Therefore, the processor 20 causes the signal REQ to rise similarly to the case of time t0 (refer to the dashed line of the signal REQ at time t13 of FIG. 2). However, since the signal REQ is already in the active state when the request at t13 is successive with the previous request, the processor issues the subsequent request by maintaining the active state. The reason is that it is possible to issue the subsequent request in a short period of time as compared with the case where the signal REQ falls to the inactive state once and subsequently rises again after it is confirmed that the request is issued by the signal ACK. Furthermore, when the subsequent request does not exist, the processor 20 causes the signal REQ to fall to the inactive state at time t13.

FIG. 2 shows the case where the subsequent request is successively issued at time t13, and this case is described as follows. When the processor 20 successively requests the recording of the data in the RAM 60, the processor 20 maintains the signal REQ in the active state at time t13. In addition the processor 20 outputs the data signal, which is the data to be recorded, the control signal which instructs the recording, and the address signal which designates the RAM 60, to the bus 70, similarly to the case where the signal REQ rises at time t0. Thereby, as the subsequent request is issued with the signal REQ maintained in the active state, the signal REQin, which is the output of the input synchronization circuit 31, is maintained in the active state at time t15 at which the clock signal CLK1 rises a second time after time t13. Here, time t15 is a time at which the mask duration Tm elapses from time t6 as the mask start time mentioned above. Hence, the signal MASK, which is output from the mask circuit 33, is in the active state from time t6 to time t15, but falls at time t15, and is changed into the inactive state at time t16.

When the signal MASK is changed into the inactive state at time t16, the signal REQin is already in the active state. Hence, when the signal RDY is in the active state, the signal REQout, which is the output of the signal output circuit 32, rises. At time t16, it is assumed that the RAM 60 is prepared to receive the data and signals, and the signal RDY is already in the active state, similarly to the above-mentioned case of time t4. Hence, the signal REQout rises at time t16 as shown in FIG. 2. Furthermore, when the RAM 60 is not prepared to receive the data and signal at time t16, the signal REQout rises at a time at which the signal RDY is changed into the active state.

When the signal REQout rises at time t16 and is changed into the active state at time t17, the data of the data signal line of the bus 70 at time t17 is recorded in the RAM 60, similarly to the case of time t5. Then, similarly to the above-mentioned cases of times t6 to t8, the signal MASK rises at time t18 as the mask start time, simultaneously the signal ACKin rises, the signal REQout falls at time t19 at which the signal MASK is changed into the active state, and the signal REQout is changed into the inactive state at time t20. Subsequently, similarly to the above-mentioned cases of times t10 to t13, the signal ACKout rises at time t22 and is changed into the active state at time t23, the signal ACK rises at time t23 and is changed into the active state at time t24, and the processor 20 confirms that the recording based on the request at time t13 is performed. After this, the process during the time period of time t13 to time t24 is repeated in the same manner mentioned above until the subsequent request does not exist.

Until now, the case where the data is successively recorded in the RAM 60 has been described, but the cases where the data is successively read from the ROM 50 or the RAM 60 and is successively read and recorded are also the same as the above. However, the case of the reading is different from the case of the recording in the following point: instead of the processor 20 outputting the data to the bus 70 and recording the data therein, the processor 20 outputs the data, which is designated to the ROM 50 and RAM 60, to the bus 70 when the signal REQout rises at time t4 and time t16 in FIG. 2 and is changed into the active state, and the processor 20 inputs the data of the bus 70 when the signal ACK rises at time t11 and time t22 in FIG. 2 and is changed into the active state. The processor 20 reads the image data of the printing target stored in the RAM 60 in accordance with the program read from the ROM 50 by repeatedly issuing the request of the reading or the recording mentioned above. Then, the processor 20 performs a process of generating print image data from the read image data and storing the data in the RAM 60. Thereby, the processor 20 controls the printing process device, which is not shown, to print the print image data.

As described above, in the synchronization circuit 30, the signal REQout remains in the inactive state until the mask duration Tm from the mask start time. In such a manner, even when the processor 20 continuously maintains the signal REQ in the active state by issuing the subsequent request successively from the previous request and it is difficult to distinguish between the previous request and the subsequent request, the signal REQout, which is output to the RAM 60, rises from the inactive state at time t16 and reaches the active state at time t17. Hence, the ROM 50 and the RAM 60 are able to distinguish between the previous request and the subsequent request.

Hereinafter, a method of setting the mask duration Tm will be described. The mask duration Tm is set as a maximum value of a virtual duration T. The virtual duration T is defined as a time period (from time t6 to time t15 in FIG. 2) from the mask start time to a time at which the input synchronization circuit 31 is able to input the signal REQ maintained in the active state from the processor 20 and convert the signal REQ into the signal REQin which is synchronized with the first clock signal CLK1 when the processor 20 confirms that the request is transmitted to the opponent by the rising edge of the signal ACK and successively issues the subsequent request by maintaining the signal REQ in the active state. The virtual duration T varies in accordance with the timing difference X between the clock signal CLK1 and the clock signal CLK2 and the periods T1 and T2. Expression 1 shows an expression for deriving the virtual duration T for setting the mask duration Tm from the timing difference X and the periods T1 and T2. Here, the timing difference X is defined as a time period until the register 35a firstly holds the active state of the signal ACKin from the rising edge time of the signal ACKin, and is the time period of time t6 to time t9 in FIG. 2. In the embodiment, since the period T2 is ½ of the period T1, the virtual duration T is three times the period T1, independent of the value of the timing difference X, on the basis of Expression 1. Accordingly, in the embodiment, the mask duration Tm is set to a value which is three times the period T1. Further, for example, when the period T2 is ⅔ of the period T1, the virtual duration T is three or four times the period T1 by the value of the timing difference X on the basis of Expression 1. In such a case, a value four times the period T1, which is the maximum value of the virtual duration T, is set as the mask duration Tm. If the mask duration Tm is set to be less than the maximum of the virtual duration T, the signal MASK is likely to reach the inactive state faster than the time the signal REQin firstly begins to be continuously maintained in the active state in response to the subsequent request issued from the processor 20. Therefore, the signal REQout is changed into the active state by the active state of the signal REQin corresponding to the active state of the signal REQ based on the previous request, and the false request is issued to the ROM 50 and RAM 60. Furthermore, in Expression 1, X+2·T2 represents the time period (from time t6 to time t13 in FIG. 2) from the mask start time to the time at which the processor 20 successively issues the subsequent request. In addition, [(int [(X+2·T2)/T1]+1]·T1 represents the time period (from time t6 to time t14 in FIG. 2) from the mask start time to the time at which the register 31a firstly begins to hold the continued active state of the signal REQ based on the subsequent request which is successively issued by the processor 20.

$$T=[(\text{int}[(X+2 \cdot T2)/T1]+1] \cdot T1+T1 \qquad \text{Expression 1}$$

Here, X satisfies 0≦X≦T2, and int(A) is defined as a value obtained by truncating the digits after decimal point of A.

In the above-mentioned embodiment, until the mask start time, the signal REQin is output as it is as the signal REQout to the ROM 50 or the RAM 60. After the mask start time, the signal REQout is masked to be in the inactive state, and is output to the ROM 50 or the RAM 60. Then, until the mask duration Tm elapses from the mask start time, the signal REQout is masked to be in the inactive state, and is continuously output to the ROM 50 or the RAM 60. After the mask duration Tm elapses, the signal REQin is output as it is as the signal REQout to the ROM 50 or the RAM 60. Thereby, even when the previous request and the subsequent request are not distinguished since the processor 20 issues the subsequent request successively from the previous request and the signal REQ is continuously maintained in the active state, the signal REQout is in the inactive state until the mask duration Tm from the mask start time, the signal REQout is changed from the inactive state to the active state after the mask duration Tm elapses, and thus the ROM 50 or the RAM 60 is able to distinguish between the previous request and the subsequent request.

Furthermore, since the mask duration Tm is set to the maximum value of the virtual duration T, it is possible to prevent the ROM 50 and the RAM 60 from falsely detecting the request issued from the processor 20 without the elapse of the mask duration Tm before arrival of the subsequent request.

Further, the invention is not limited to the above-mentioned embodiment, and may be modified in various forms without departing from the technical spirit of the invention.

For example, in the above-mentioned embodiment, the period T2 is set to ½ of the period T1, but may be set to any value if only the values of the periods T1 and T2 are different from each other. For example, the period T2 may be set to be longer than the period T1. Although the periods T1 and T2 are set to any values, it is possible to set the mask duration Tm on the basis of the virtual duration T derived from Expression 1.

In the above-mentioned embodiment, at the time (t13) at which the clock signal CLK2 is changed into the active state after the signal ACK is changed into the active state, the processor 20 performs any one of processes of maintaining the signal REQ in the active state in order to issue the subsequent request successively after the process of changing the signal REQ into the inactive state. However, the time for performing any one of the processes may be appropriately determined if the time is after the signal ACK is changed into the active state. For example, at the time at which the clock signal CLK2 is changed into the active state a second time after the signal ACK is changed into the active state, the processor 20 may perform any one of processes of maintaining the signal REQ in the active state in order to issue the subsequent request successively after the process of changing the signal REQ into the inactive state.

In the above-mentioned embodiment, the mask circuit 33 is configured so that the mask start time is set as the time at which the clock signal CLK1 is changed from the inactive state to the active state after the signal REQout is changed from the inactive state to the active state. However, the mask start time may be set as any time if only the time is after the signal REQout is changed from the inactive state to the active state.

In the above-mentioned embodiment, the ACK circuit 35 causes the signal ACKin to rise at the mask start time and the signal ACKin to continuously be in the active state only during the time periods until the period T1 elapses. However, the ACKin signal may arise at any time if only the time is after the signal REQout is changed from the inactive state to the active state. Further, the time period, in which the active state is continuously maintained, is also not limited to the period T1, and may be any time period if only the processor 20 is able to detect that the signal ACKin is changed into the active state. However, it is preferred that the signal ACKin rises as soon as possible after the signal REQout is changed into the active state so that the processor 20 promptly issues the subsequent request since it is possible to notify the recording and the reading based on the request to the processor 20.

In the above-mentioned embodiment, the mask duration Tm is set to the maximum value of the virtual duration T, but may be set to any value if only the value is not less than the virtual duration T. However, as the mask duration Tm increases, the time at which the signal REQout rises in response to the subsequent request is delayed. Hence, it is preferred that the mask duration Tm be set as the shortest possible period of time so that the ROM 50 and the RAM 60 promptly performs the reading and the recording based on the subsequent request.

In the above-mentioned embodiment, the processor system 10 is configured to include the one processor 20 and the one synchronization circuit 30, but may be configured to include a plurality of processors. In such a case, it may be possible to adopt a configuration in which a plurality of synchronization circuits are respectively connected to the processors. In addition, it may also possible to adopt a configuration in which one synchronization circuit is connected to the plurality of processors.

In the above-mentioned embodiment, the processor 20 is configured to exchange data with the ROM 50 and RAM 60, but may be configured to exchange data with any device such as other processor, input-output port for exchanging data with the devices connected to the outside, or a bus controller for adjusting permission to use the bus.

Finally, a processor system 10a according to a reference example other than the embodiment of the invention will be described with reference to FIGS. 3 and 4. Even in the processor system 10a, it is possible to distinguish between the previous request and the subsequent request. Furthermore, in the case where common components of the processor system 10a and the processor system 10 exist, those components will be referenced by the same reference numerals and signs.

Figure 3:
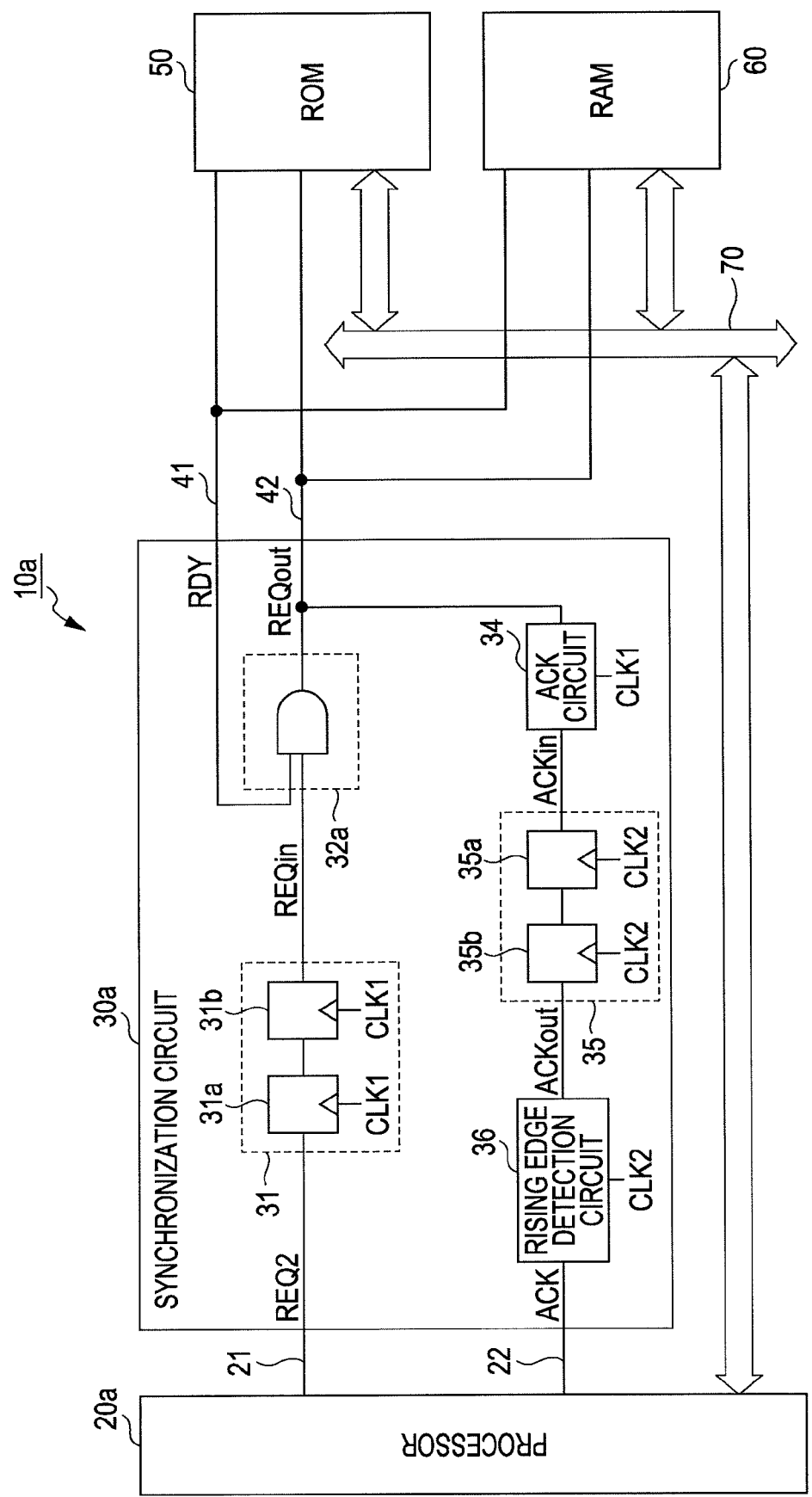
FIG. 3 is a configuration diagram schematically illustrating a configuration of a processor system according to a reference example.

FIG. 3 is a configuration diagram schematically illustrating the configuration of the processor system 10a. As shown in FIG. 3, the synchronization circuit 30a of the processor system 10a does not include the mask circuit 33, unlike the synchronization circuit 30. Furthermore, the synchronization circuit 30a includes, instead of the signal output circuit 32, a signal output circuit 32a for outputting a signal REQout represented by a logical AND of the signal REQin and the signal RDY. The other configurations of the synchronization circuit 30a are the same as those of the synchronization circuit 30. Furthermore, unlike the processor 20, the processor 20a of the processor system 10a does not output the signal REQ as it is, but outputs a signal REQ2 which is a signal subjected to a mask process to be described later. The others are the same as the processor 20.

Figure 4:
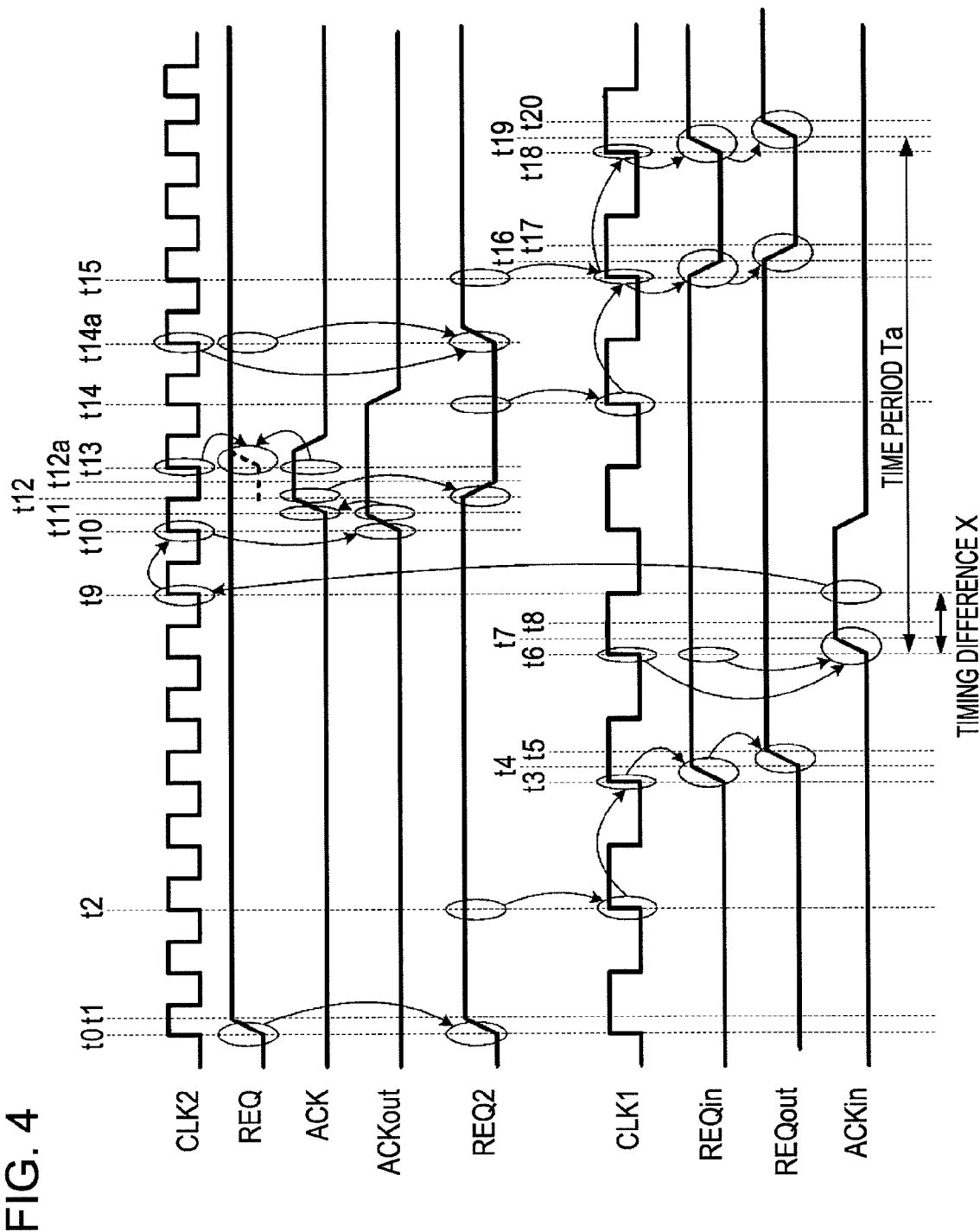
FIG. 4 is an example of a timing chart illustrating signal states in the reference example.
Figure 5A:
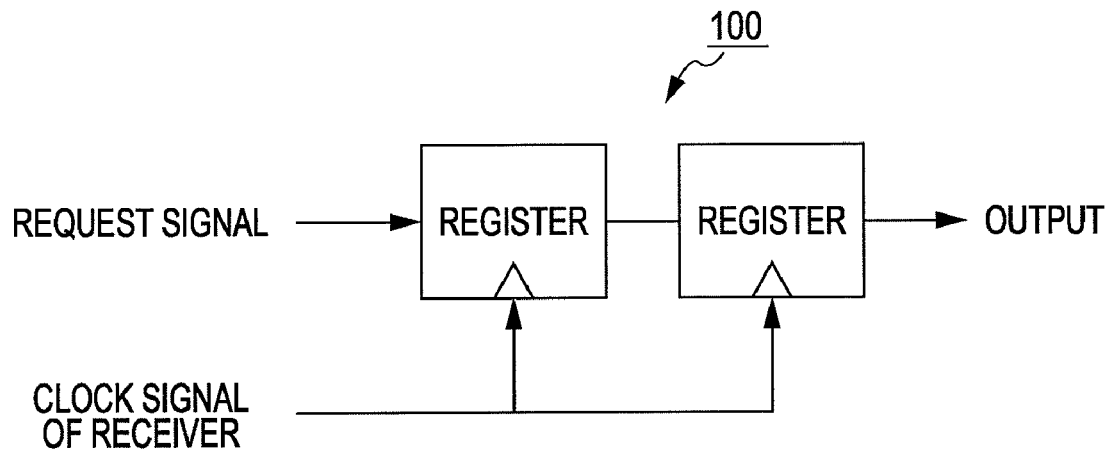
FIG. 5A is a configuration diagram of a synchronization circuit.
Figure 5B:
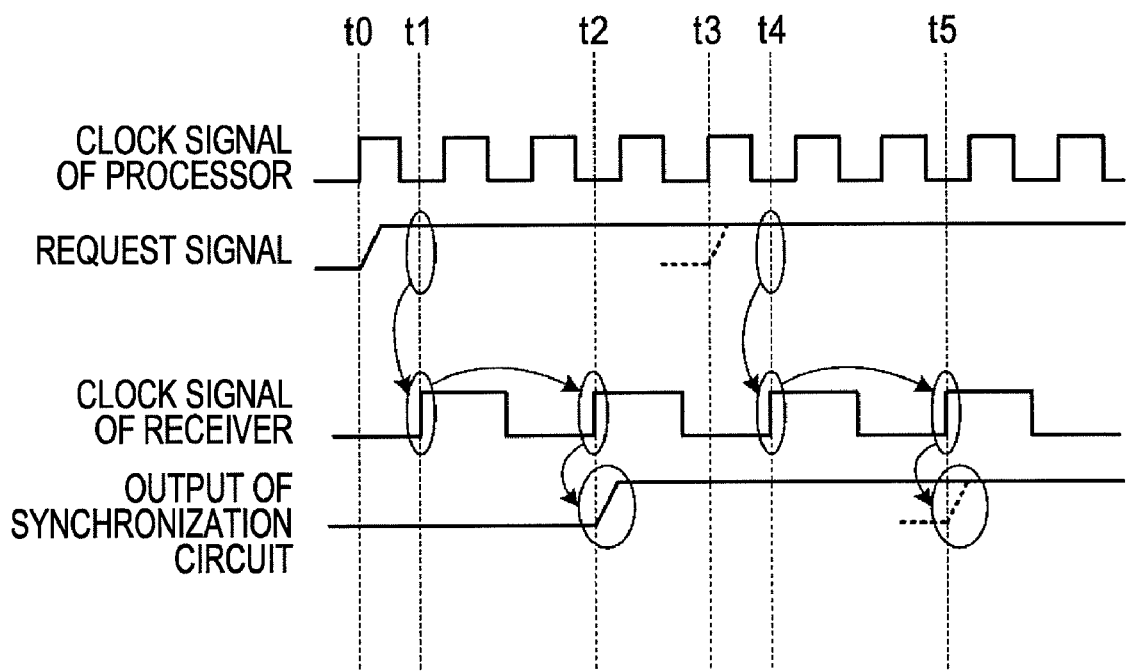
FIG. 5B is an explanatory diagram illustrating signal states of the synchronization circuit.

In the processor system 10a, FIG. 4 shows an example of a timing chart illustrating signal states in the case where the processor 20a successively requests the recording of data in the RAM 60, similarly to FIG. 2. Furthermore, in FIG. 4, the same times as those of FIG. 2 are denoted by the same reference numerals and signs.

As shown in FIG. 4, the signal REQ2 is output in the same states as those of the signal REQ from time t0 to time t11. Here, descriptions of the signal ACK, the signal ACKout, the signal REQin, the signal REQout, and the signal ACKin will be omitted since those are in the same state shown in FIG. 2. Then, similarly to FIG. 2, the signal ACK, which is the output of the rising edge detection circuit 36, rises at time t11, and is changed into the active state at time t12. Then, the mask process is performed to change the signal REQ2 into the inactive state. Thereby, the signal REQ2 falls at time t12a. The mask process is performed until time t14a which is the third rising edge time of the clock signal CLK2 from time t12 at which the signal ACK is changed into the active state. Due to the mask process, in the case of FIG. 2, the input synchronization circuit 31 inputs the signal REQ which is maintained in the active state by successively issuing the subsequent request at time t13, and thus the signal REQin at time t15 is still in the active state at time t15. However, in the case of FIG. 4, since the signal REQ2 is in the inactive state, the signal REQin falls at time t15 and is changed into the inactive state at time t16. Accordingly, in FIG. 4, the signal REQout falls at time t16 and is changed into the inactive state at time t17. Then, in FIG. 4, since the signal REQ2 rises by terminating the mask process at time t14a, the signal REQout rises at time t19 and is changed into the active state at time t20. In such a manner, the recording requested by the processor 20a is performed.

As described above, it is possible to distinguish between the previous request and the subsequent request in the way that the signal REQ2, which is output from the processor 20a, falls when the signal ACK is changed into the active state. In the processor system 10 shown in FIG. 2, the signal REQout rises at time t16, and the subsequent request is output to the ROM 50 or the RAM 60. However, in the processor system 10a according to the reference example, the signal REQout rises at time t19, and the time period as long as the period T1 is required until the process based on the subsequent request is performed. Accordingly, the processor system 10 according to the embodiment of the invention is able to perform the process based on the subsequent request during a shorter period of time. Furthermore, in the reference example, Expression 2 shows an expression for deriving a time period Ta (from time t6 to time t19 in FIG. 4) from the timing difference X and the periods T1 and T2. The time period Ta is defined as a time period from the rising edge time of the signal ACKin to the time at which the signal REQin is changed into the active state in response to the subsequent request when the processor 20a confirms that the request is issued to the opponent by the rising edge of the signal ACK and successively issues the subsequent request. The time period Ta in Expression 2 is not less than the virtual duration T in Expression 1 although the periods T1 and T2 and the timing difference X can have any values. Accordingly, the processor 20 according to the embodiment is able to perform the process based on the subsequent request in a shorter period of time than that of the processor 20a, independent of the timing difference X and the periods T1 and T2. Furthermore, the time period t in Expression 2 represents a time period (from time t12 to time t14a in FIG. 4) in which the mask process is performed.

$$Ta=[(\text{int}[(X+T2+t)/T1]+1]\cdot T1+T1 \qquad \text{Expression 2}$$

Here, $t=[\text{int}(T1/T2)+1]T2$

What is claimed is:

1. A signal synchronization method of performing signal synchronization between a device which operates in synchronization with a first clock signal and a processor which operates in synchronization with a second clock signal with a different cycle from that of the first signal, changes a request signal from an inactive state to an active state when data communication with the device is requested, then maintains the request signal in the active state when detecting an acknowledgement signal for the request signal and successively issuing the subsequent request, and changes the request signal to the inactive state when not successively issuing the subsequent request, the signal synchronization method comprising:

(a) converting the request signal, which is input by the processor, into a synchronized request signal which is synchronized with the first clock signal;

(b) outputting the synchronized request signal to the device without masking the synchronized request signal until a mask start time and outputting the synchronized request signal which is changed into the inactive state by masking the synchronized request signal after the mask start time, the mask start time being set as a time at which the first clock signal is changed from the inactive state to the active state after the output synchronized request signal is changed from the inactive state to the active state and the device is able to receive the synchronized request signal;

(c) converting the maintained request signal in the active state into the synchronized request signal, which is input from the processor and is synchronized with the first clock signal, when the processor, which has input the acknowledgement signal, issues the subsequent request while maintaining the request signal in the active state; and (d) outputting the synchronized request signal, which is changed into the inactive state by masking the synchronized request signal, to the device before a predetermined mask duration elapses from the mask start time, and outputting the synchronized request signal, which is not masked, to the device after the mask duration elapses from the mask start time, wherein the mask duration is set to be not less than a time period from the mask start time to a time at which the converting (c) of the maintained request signal in the active state into the synchronized request signal can be performed regardless of the timing difference between the first clock signal and the second clock signal.

2. The signal synchronization method according to claim 1, wherein the mask duration is set as a time period from the mask start time to a time at which the converting (c) of the maintained request signal in the active state into the synchronized request signal can be performed regardless of the timing difference between the first clock signal and the second clock signal.

3. The signal synchronization method according to claim 1, wherein the first clock signal is a clock signal having a period longer than that of the second clock signal.

4. A signal synchronization circuit for performing signal synchronization between a device which operates in synchronization with a first clock signal and a processor which operates in synchronization with a second clock signal of a period different from that of the first signal, changes a request signal from an inactive state to an active state when data communication with the device is requested, then maintains the request signal in the active state when detecting an acknowledgement signal for the request signal and successively issuing the subsequent request, and changes the request signal to the inactive state when not successively issuing the subsequent request, the signal synchronization circuit comprising:

a synchronization section for converting the request signal, which is input by the processor, into a synchronized request signal which is synchronized with the first clock signal; and a signal output section for outputting the synchronized request signal to the device without masking the synchronized request signal until a mask start time and outputting the synchronized request signal which is changed into the inactive state by masking the synchronized request signal after the mask start time, the mask start time being set as a time at which the first clock signal is changed from the inactive state to the active state after the output synchronized request signal is changed from the inactive state to the active state and the device is able to receive the synchronized request signal, wherein the signal output section outputs the synchronized request signal, which is changed into the inactive state by masking the synchronized request signal, to the device before a predetermined mask duration elapses from the mask start time, and outputs the synchronized request signal, which is not masked, to the device after the mask duration elapses from the mask start time, wherein the mask duration is set to be not less than a time period from the mask start time to a time at which the synchronization section is able to convert, regardless of the timing difference between the first clock signal and the second clock signal, the maintained request signal in the active state into the synchronized request signal, which is input from the processor and is synchronized with the first clock signal, when the processor, which has input the acknowledgement signal, issues the subsequent request while maintaining the request signal in the active state.

\* \* \* \* \*